(12) United States Patent
Ikemoto

(10) Patent No.: US 9,840,993 B2
(45) Date of Patent: Dec. 12, 2017

(54) INTERNAL COMBUSTION ENGINE

(71) Applicant: TOYOTA JIDOSHA KABUSHIKI KAISHA, Toyota-shi, Aichi-ken (JP)

(72) Inventor: Masato Ikemoto, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 64 days.

(21) Appl. No.: 14/924,935

(22) Filed: Oct. 28, 2015

(65) Prior Publication Data
US 2016/0123265 A1  May 5, 2016

(30) Foreign Application Priority Data

Oct. 30, 2014  (JP) ................................ 2014-221161

(51) Int. Cl.
| | |
|---|---|
| F02M 45/10 | (2006.01) |
| F02M 45/12 | (2006.01) |
| F02D 41/20 | (2006.01) |
| F02D 41/40 | (2006.01) |
| F02M 63/00 | (2006.01) |

(Continued)

(52) U.S. Cl.
CPC ........... F02M 45/10 (2013.01); F02D 41/405 (2013.01); F02M 45/12 (2013.01); *F02D 41/2096* (2013.01); *F02D 41/403* (2013.01); *F02D 2200/0602* (2013.01); *F02D 2250/11* (2013.01); *F02M 45/02* (2013.01); *F02M 45/04* (2013.01); *F02M 63/0026* (2013.01); *Y02T 10/44* (2013.01)

(58) Field of Classification Search
CPC .... F02D 41/405; F02D 41/20; F02D 41/3836; F02D 41/047; F02D 2041/389; F02D 2200/0614; F02D 2200/101; F02D 2250/38; F02D 41/2096; F02D 41/403; F02D 2200/0602; F02M 45/04; F02M 45/10; F02M 45/02; F02M 63/0026
USPC ......................................... 701/103; 123/299
See application file for complete search history.

(56) References Cited

U.S. PATENT DOCUMENTS

| | | | | |
|---|---|---|---|---|
| 6,904,893 | B2* | 6/2005 | Hotta | F02D 41/3836 |
| | | | | 123/299 |
| 7,284,712 | B2* | 10/2007 | Funai | F02M 47/027 |
| | | | | 239/533.1 |

(Continued)

FOREIGN PATENT DOCUMENTS

| | | |
|---|---|---|
| CN | 103244293 A | 8/2013 |
| JP | 2002-317734 | 10/2002 |

(Continued)

*Primary Examiner* — Carlos A Rivera
*Assistant Examiner* — Anthony Taylor, Jr.
(74) *Attorney, Agent, or Firm* — Finnegan, Henderson, Farabow, Garrett & Dunner, LLP

(57) ABSTRACT

An internal combustion engine comprises a fuel injection valve which has a needle, wherein a valve opening speed of the needle during post injection is raised as compared with a valve opening speed of the needle during main injection if a pressure of the fuel is not more than a first predetermined pressure, while the valve opening speed of the needle during the post injection is lowered as compared with the valve opening speed of the needle during the main injection if the pressure of the fuel is not less than a second predetermined pressure that is a pressure larger than the first predetermined pressure, when a requested post injection fuel amount is larger than an injection amount threshold value.

4 Claims, 12 Drawing Sheets

(51) Int. Cl.
*F02M 45/02* (2006.01)
*F02M 45/04* (2006.01)

(56) References Cited

U.S. PATENT DOCUMENTS

| | | | |
|---|---|---|---|
| 7,373,918 B2* | 5/2008 | Uchiyama | F02D 41/1498 123/299 |
| 8,596,245 B2* | 12/2013 | Hiratani | F02D 41/0085 123/299 |
| 2006/0016424 A1* | 1/2006 | Gioannini | F02D 41/029 123/299 |
| 2007/0034177 A1* | 2/2007 | Yoshizaki | F02D 41/20 123/54.7 |
| 2007/0074702 A1* | 4/2007 | Nakamura | F01N 3/035 123/299 |
| 2008/0201060 A1* | 8/2008 | Nagai | F02D 35/023 701/103 |
| 2008/0228374 A1* | 9/2008 | Ishizuka | F02D 41/3809 701/103 |
| 2008/0243358 A1* | 10/2008 | Kojima | F02D 35/025 701/102 |
| 2008/0281500 A1* | 11/2008 | Nakata | F02D 41/3809 701/103 |
| 2009/0063012 A1* | 3/2009 | Nakata | F02D 41/2467 701/103 |
| 2009/0063013 A1* | 3/2009 | Nakata | F02D 41/3809 701/103 |
| 2009/0063016 A1* | 3/2009 | Nakata | F02D 41/2096 701/103 |
| 2009/0288638 A1* | 11/2009 | Dintino | F02D 41/3863 123/447 |
| 2010/0088006 A1* | 4/2010 | Ito | F02D 41/2096 701/103 |
| 2010/0312454 A1* | 12/2010 | Nada | F02D 41/403 701/103 |
| 2011/0180039 A1* | 7/2011 | Nada | F02D 35/02 123/445 |
| 2012/0016571 A1* | 1/2012 | Nada | F02D 41/3035 701/104 |
| 2012/0143479 A1* | 6/2012 | Nada | F02D 41/3029 701/104 |
| 2013/0001327 A1* | 1/2013 | Fedrow | F02M 47/027 239/585.1 |
| 2013/0192562 A1* | 8/2013 | Matsumura | F02M 69/04 123/445 |

FOREIGN PATENT DOCUMENTS

| | | |
|---|---|---|
| JP | 2006-132375 | 5/2006 |
| JP | 2007-162644 A | 6/2007 |
| JP | 2013-199916 | 10/2013 |

* cited by examiner

[Fig. 1]
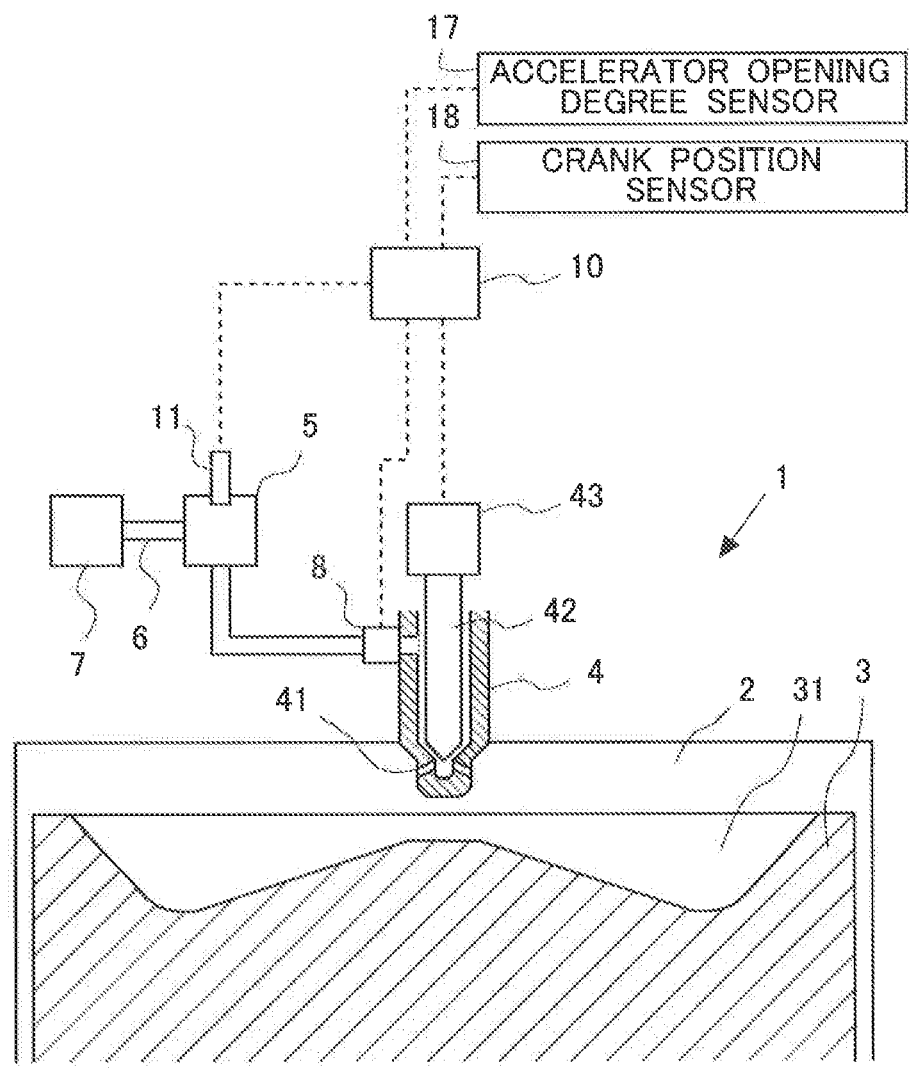

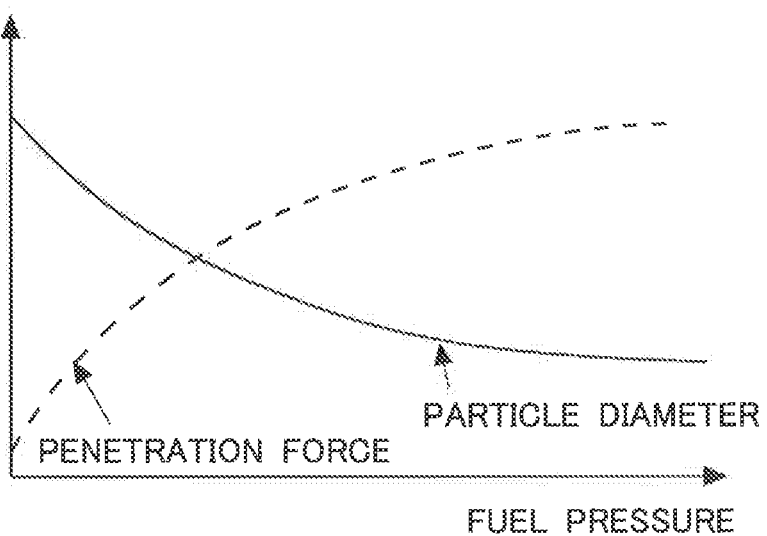

[Fig. 3]
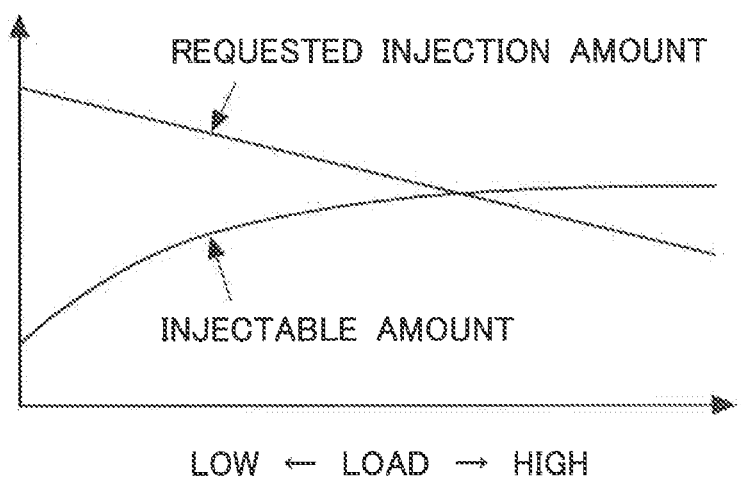

[Fig. 4]
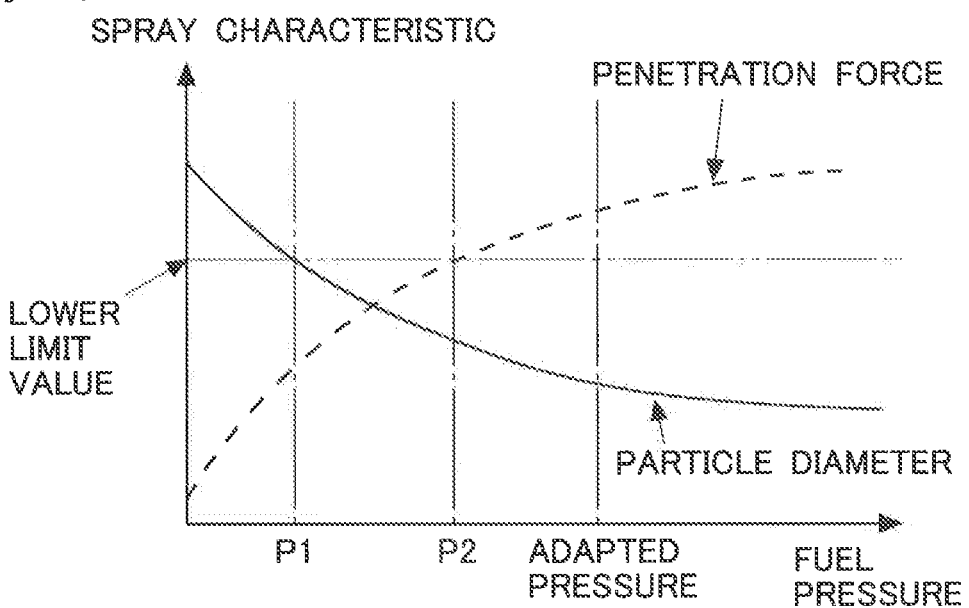

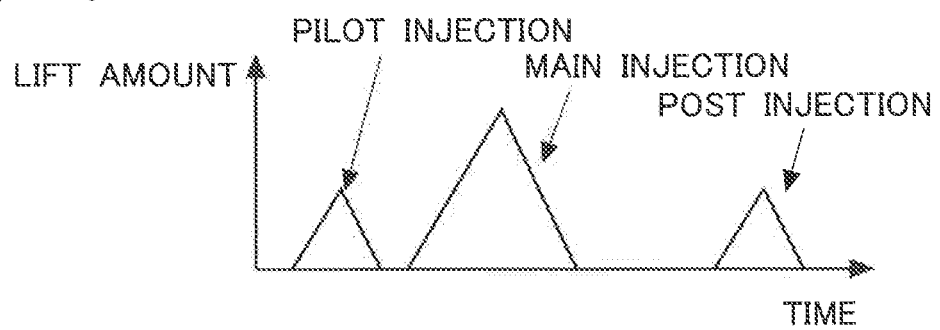
[Fig. 5A]

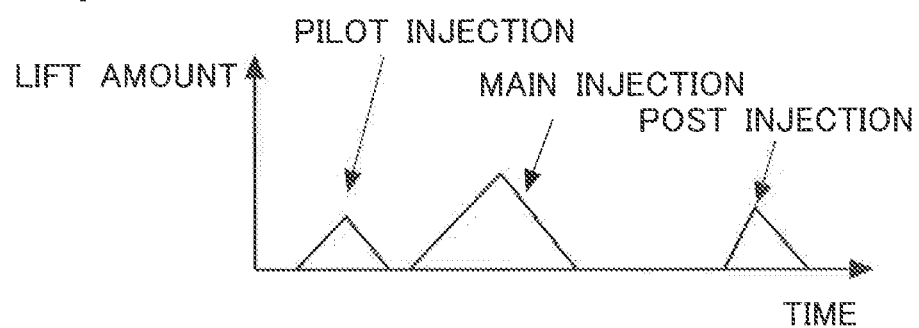

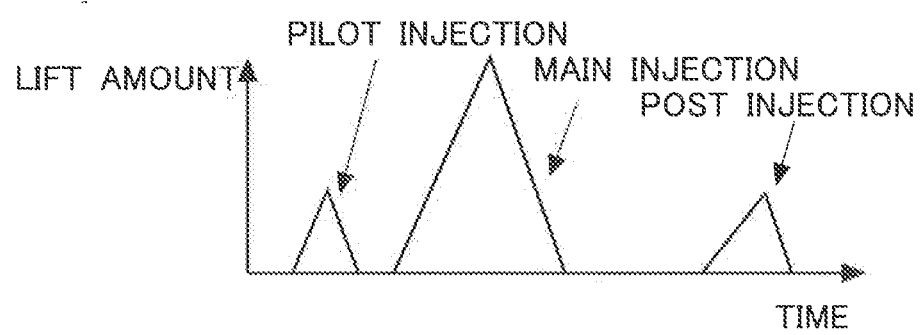

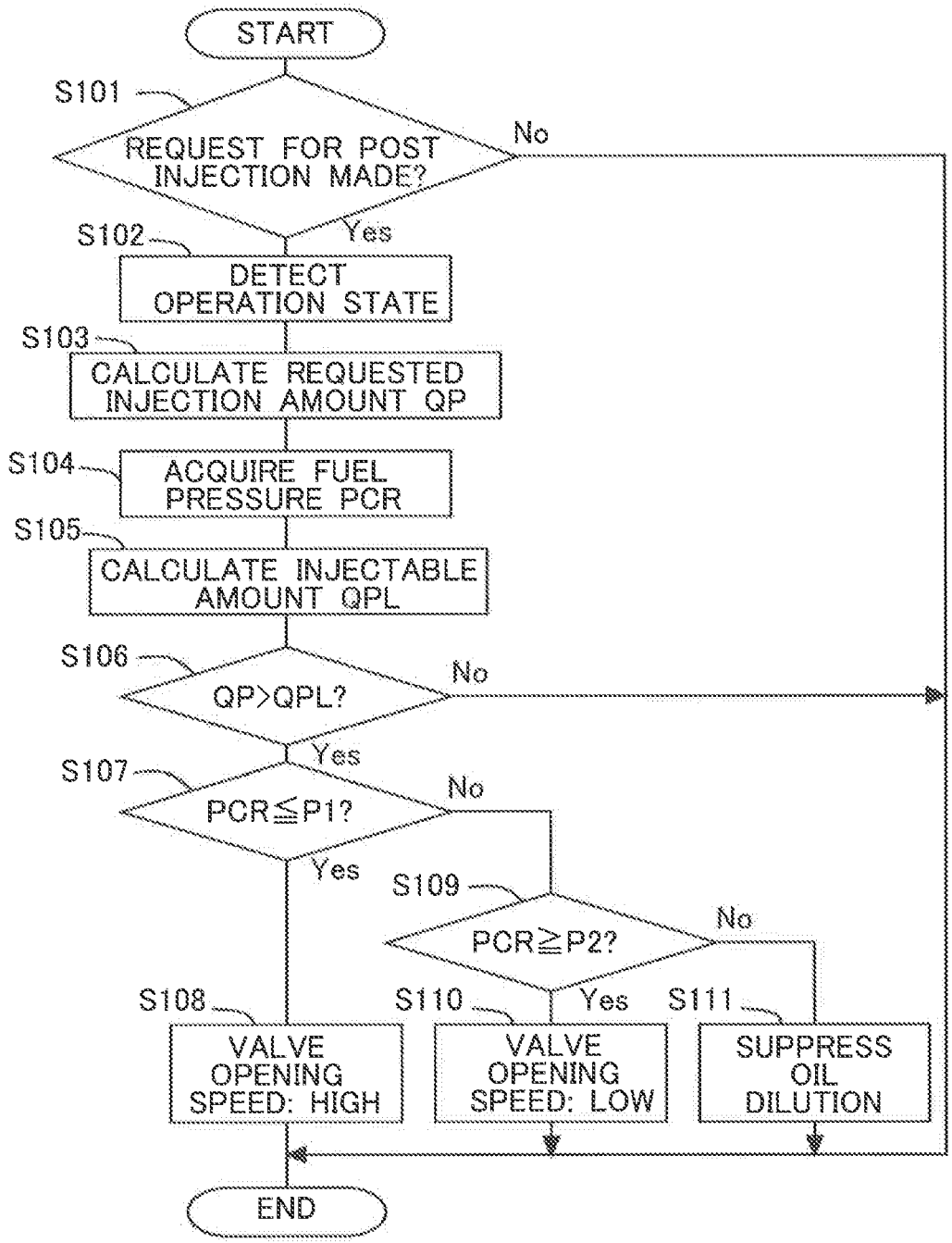
[Fig. 6]

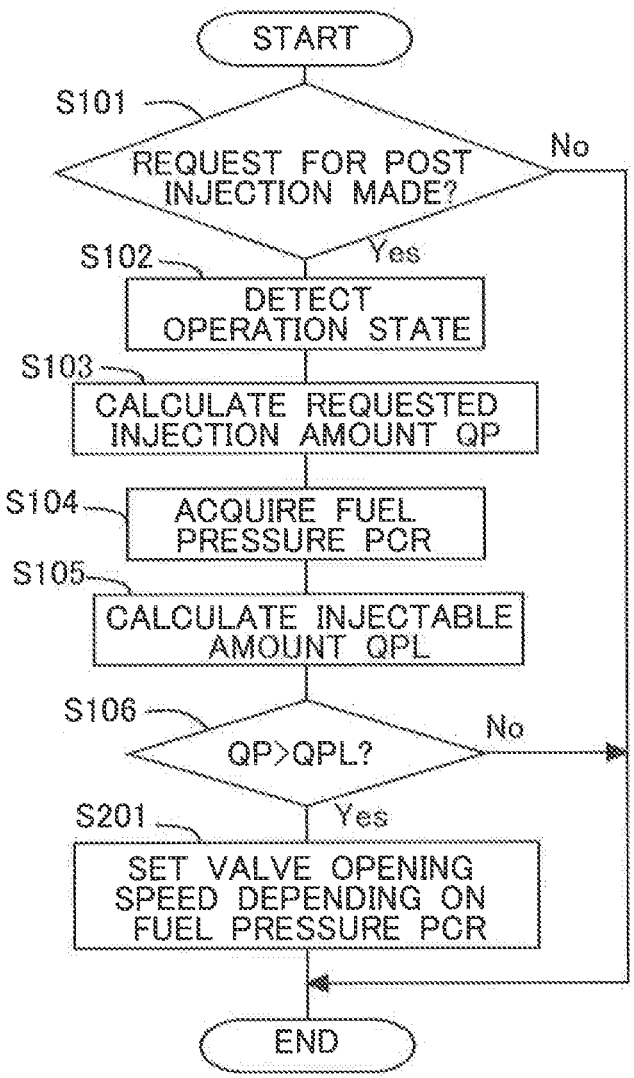

[Fig. 8]
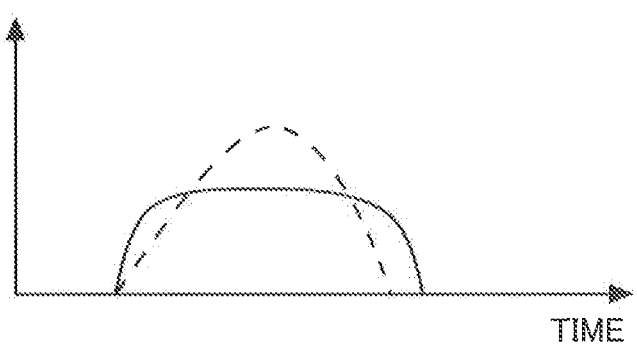
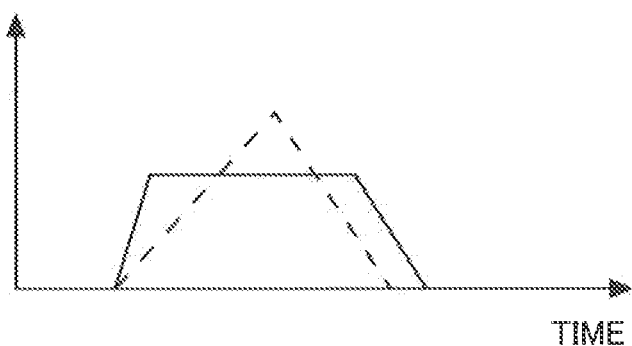

[Fig. 9]
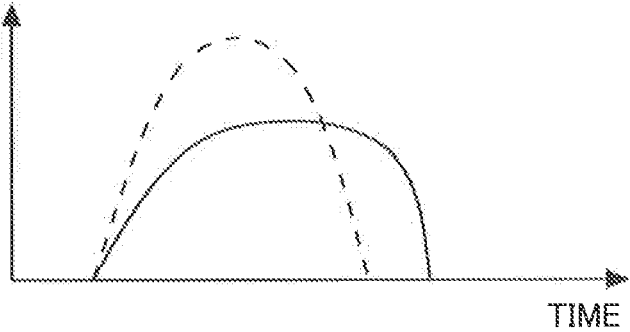
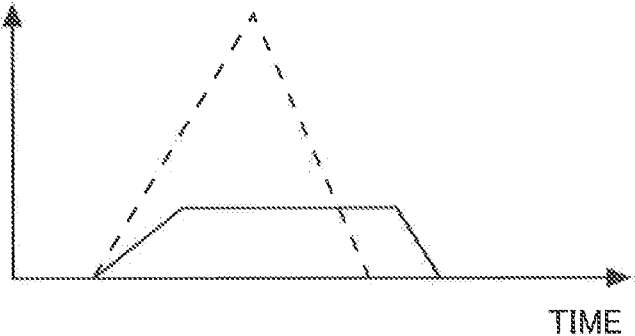

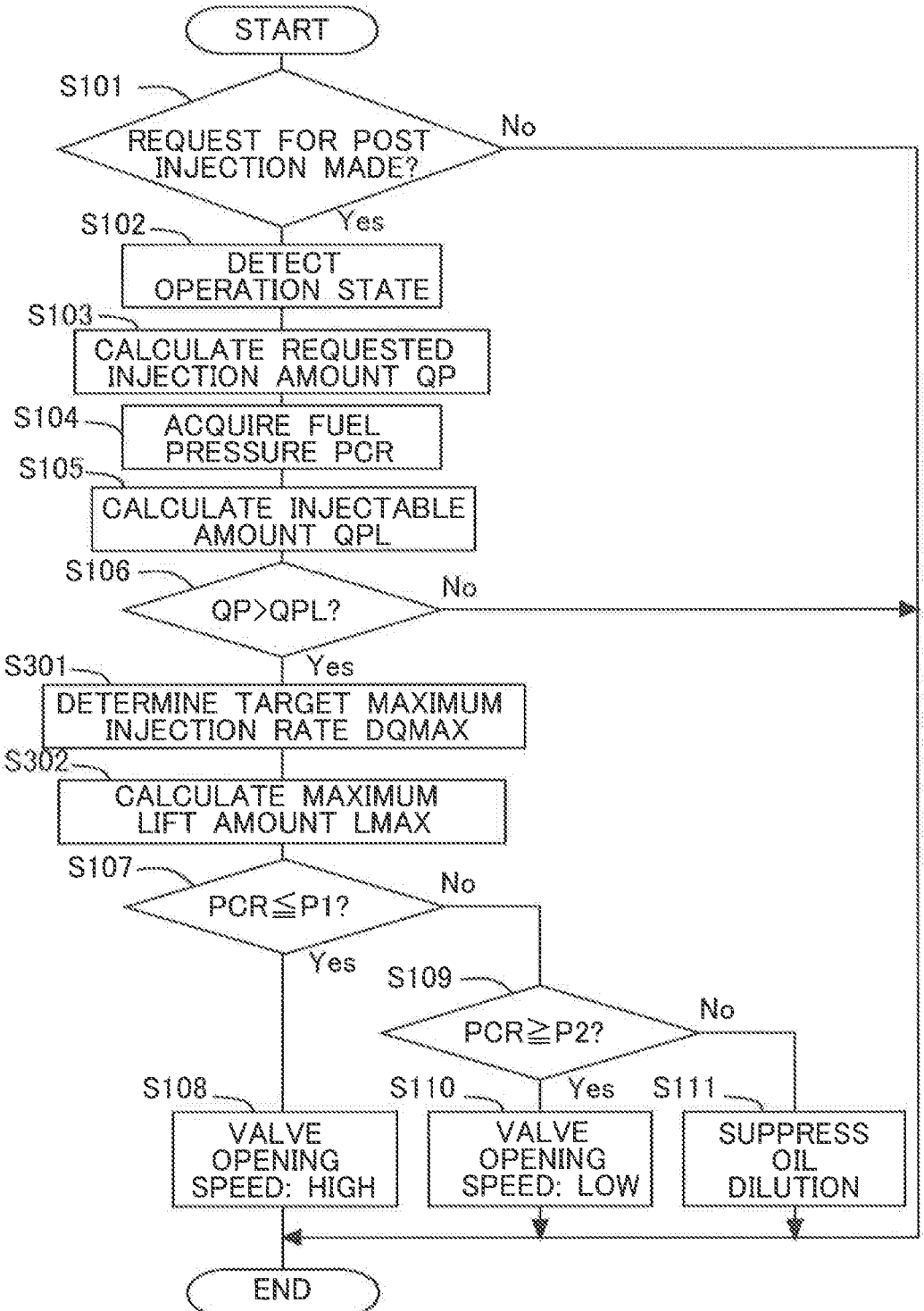
[Fig. 10]

INTERNAL COMBUSTION ENGINE

CROSS REFERENCE TO RELATED APPLICATIONS

This application claims priority to Japanese Patent Application No. 2014-221161 filed on Oct. 30, 2014, the entire contents of which are incorporated by reference herein.

TECHNICAL FIELD

The present invention relates to an internal combustion engine.

BACKGROUND ART

It is known that the fuel injection, in which the fuel is injected into a cylinder of an internal combustion engine, is carried out in a divided manner a plurality of times. In this case, unburned fuel can be discharged to an exhaust passage by carrying out the post injection after the main injection. The post injection is performed, for example, when the position of a piston is relatively low in the vicinity of the end of the expansion stroke. On this account, the fuel, which is injected by the post injection, hardly contributes to the torque of the internal combustion engine. Then, the heat can be generated by reacting the unburned fuel discharged to the exhaust passage after the post injection by using a catalyst to regenerate a filter by utilizing the heat. Further, the unburned fuel can be supplied as a reducing agent to the catalyst to perform, for example, the reduction of NOx. However, the post injection is carried out when the position of the piston is relatively low, and hence it is feared that the fuel, which is injected by the post injection, may arrive at a wall surface of the cylinder to dilute oil.

For example, when the load exerted on the internal combustion engine is low, then the temperature in the cylinder, which is provided when the fuel injected by the main injection is combusted, is low, and hence the fuel is hardly evaporated. Further, when the load exerted on the internal combustion engine is low, the pressure of the fuel is set to be low. Therefore, in such a case, the particle diameter (particle size) of the injected fuel is increased, and the fuel is hardly evaporated. Further, when the load exerted on the internal combustion engine is low, the temperature of the gas discharged from the cylinder is low. Therefore, the amount of the fuel, which is provided during the post injection and which is required to raise the temperature of the catalyst, is increased as well. On this account, the fuel is hardly evaporated.

On the other hand, when the load exerted on the internal combustion engine is high, the injection pressure of the fuel is set to be high in order to reduce the smoke. The post injection is performed, for example at a timing near to the end of the expansion stroke. Therefore, the post injection is performed after the pressure in the cylinder is lowered. In such a situation, the pressure of the fuel is relatively raised as compared with the pressure in the cylinder, and hence the penetration force of the fuel is raised. On this account, the time, which is required until the fuel arrives at the wall surface of the cylinder, is shortened. Therefore, the fuel, which is injected by the post injection, easily arrives at the wall surface of the cylinder before being evaporated.

In this context, a technique is known, in which the dilution of the oil is suppressed by selecting a smaller injection amount from the injection amount at which the fuel injected by the post injection does not arrive at the wall surface of the cylinder in a state of liquid and the injection amount which is requested from the temperature of the catalyst (see, for example, Patent Literature 1).

PRIOR ART LITERATURES

Patent Literatures

Patent Literature 1: Japanese Patent Application Laid-Open No. 2006-132375

Patent Literature 2: Japanese Patent Application Laid-Open No. 2002-317734

Patent Literature 3: Japanese Patent Application Laid-Open No. 2013-199916

SUMMARY OF THE INVENTION

Problems to be Solved by the Invention

In the case of the conventional technique as described above, when there is any possibility of the oil dilution, the injection amount, which is smaller than the injection amount requested from the temperature of the catalyst, is always injected. Therefore, a certain time is required to raise the temperature of the catalyst.

The present invention has been made taking the foregoing problem into consideration, an object of which is to utilize the post injection more effectively.

Means for Solving the Problems

In order to achieve the object as described above, according to the present invention, there is provided an internal combustion engine comprising a fuel injection valve which has a needle and which injects fuel into a cylinder of the internal combustion engine when the valve having the needle is opened; the internal combustion engine further comprising a controller comprising at least one processor configured to raise a valve opening speed of the needle during post injection as compared with a valve opening speed of the needle during main injection if a pressure of the fuel is not more than a first predetermined pressure and comprising at least one processor configured to lower the valve opening speed of the needle during the post injection as compared with the valve opening speed of the needle during the main injection if the pressure of the fuel is not less than a second predetermined pressure that is a pressure larger than the first predetermined pressure, when a requested injection amount of the fuel to be injected by the post injection is larger than an injection amount threshold value, when the post injection is carried out after the main injection of the fuel to be injected from the fuel injection valve.

The post injection is the fuel injection which is performed after the main injection. The post injection is performed, for example, in the latter period of the expansion stroke. In this context, the particle diameter of the fuel injected by the post injection is large during the operation in which the pressure of the fuel is low, and hence the fuel is hardly evaporated. Therefore, the controller raises the valve opening speed of the needle during the post injection, and thus the controller promptly increases the cross-sectional area of the passage for the fuel in the fuel injection valve. Accordingly, it is possible to promptly raise the injection amount of the fuel per unit time. Therefore, it is possible to decrease the particle diameter of the fuel.

On the other hand, the penetration force of the fuel injected by the post injection is high during the operation in which the pressure of the fuel is high. Therefore, the fuel easily arrives at the wall surface of the cylinder before the fuel injected by the post injection is evaporated. In view of the above, the controller lowers the valve opening speed of the needle, and thus the controller gently increases the cross-sectional area of the passage for the fuel in the fuel injection valve. Accordingly, it is possible to reduce the injection amount of the fuel per unit time. Therefore, it is possible to lower the penetration force of the fuel.

Therefore, if the pressure of the fuel is not more than the first predetermined pressure, the valve opening speed of the needle during the post injection is made higher than the valve opening speed of the needle during the main injection, while if the pressure of the fuel is not less than the second predetermined pressure, the valve opening speed of the needle during the post injection is made lower than the valve opening speed of the needle during the main injection. By doing so, it is possible to suppress the fuel from arriving at the wall surface of the cylinder. Accordingly, it is possible to suppress the dilution of the oil by the fuel.

In this context, the post injection fuel amount is set, for example, to the fuel amount which is requested to raise the temperature of the catalyst. Therefore, for example, when the load on the internal combustion engine is low, the temperature of the exhaust gas is low. Therefore, the post injection fuel amount, which is in a larger amount, is requested. If the post injection fuel amount is increased, the fuel is hardly evaporated. Therefore, the fuel easily arrives at the wall surface of the cylinder. That is, the post injection fuel amount, which behaves as the boundary to determine whether or not the dilution of the oil occurs, exists. Therefore, the value thereof is regarded as the injection amount threshold value. Then, the case, in which the requested injection amount of the fuel to be injected by the post injection is larger than the injection amount threshold value, is regarded as the precondition to adjust the valve opening speed of the needle during the post injection. Note that the injection amount threshold value can be the upper limit value of the post injection fuel amount at which the fuel does not arrive at the wall surface of the cylinder even when the valve opening speed of the needle during the post injection is the same as the valve opening speed of the needle during the main injection, or the injection amount threshold value can be the upper limit value of the post injection fuel amount at which the fuel arriving at the wall surface of the cylinder when the valve opening speed of the needle during the post injection is the same as the valve opening speed of the needle during the main injection is within an allowable range.

Further, the pressure of the fuel is changed depending on the operation state of the internal combustion engine. Then, the particle diameter of the fuel and the penetration force of the fuel are changed in accordance with the change of the pressure of the fuel. In this context, the first predetermined pressure can be the upper limit value of the pressure of the fuel at which the fuel arrives at the wall surface of the cylinder in accordance with the increase in the particle diameter of the fuel injected by the post injection when the valve opening speed of the needle during the post injection is the same as the valve opening speed of the needle during the main injection. Further, the first predetermined pressure can be also the upper limit value of the pressure of the fuel at which the fuel injected by the post injection does not adhere to the wall surface of the cylinder or the fuel is suppressed from the adhesion by raising the valve opening speed of the needle during the post injection as compared with the valve opening speed of the needle during the main injection. Further, the second predetermined pressure can be the lower limit value of the pressure of the fuel at which the fuel arrives at the wall surface of the cylinder on account of the large penetration force of the fuel when the valve opening speed of the needle during the post injection is the same as the valve opening speed of the needle during the main injection. Further, the second predetermined pressure can be also the lower limit value of the pressure of the fuel at which the fuel injected by the post injection does not adhere to the wall surface of the cylinder or the fuel is suppressed from the adhesion by lowering the valve opening speed of the needle during the post injection as compared with the valve opening speed of the needle during the main injection.

Further, the controller can be operated such that the higher the pressure of the fuel is, the lower the valve opening speed of the needle during the post injection is, if the pressure of the fuel is not more than the first predetermined pressure or if the pressure of the fuel is not less than the second predetermined pressure.

The lower the pressure of the fuel is, the larger the particle diameter of the fuel during the post injection is. On this account, when the pressure of the fuel is not more than the first predetermined pressure, it is possible to suppress the increase in the particle diameter of the fuel during the post injection by raising the valve opening speed of the needle during the post injection as the pressure of the fuel is more lowered. Accordingly, it is possible to suppress the fuel from arriving at the wall surface of the cylinder. This can be expressed such that the higher the pressure of the fuel is, the lower the valve opening speed of the needle during the post injection is. On the other hand, when the pressure of the fuel is not less than the second predetermined pressure, it is possible to suppress the penetration force of the fuel from being raised by lowering the valve opening speed of the needle during the post injection as the pressure of the fuel is more raised. Therefore, it is possible to suppress the fuel from arriving at the wall surface of the cylinder.

Further, the controller can be operated such that a maximum value of a lift amount of the needle during the post injection is decreased when the pressure of the fuel is high as compared with when the pressure of the fuel is low, if the pressure of the fuel is not more than the first predetermined pressure or if the pressure of the fuel is not less than the second predetermined pressure.

When the maximum value of the needle lift amount is increased, the fuel injection amount per unit time is increased. If the pressure of the fuel is not more than the first predetermined pressure, the valve opening speed of the needle during the post injection is raised. However, on account thereof, it is feared that the fuel injection amount per unit time may be increased, and the penetration force of the fuel may be excessively increased. In relation thereto, it is possible to suppress the penetration force of the fuel from being increased by decreasing the maximum value of the needle lift amount. On the other hand, when the pressure of the fuel is not less than the second predetermined pressure, the pressure of the fuel is high from the beginning. Therefore, even when the valve opening speed of the needle is lowered, the penetration force of the fuel is still large in some cases. In relation thereto, it is possible to reduce the penetration force of the fuel by decreasing the maximum value of the needle lift amount.

Advantageous Effect of the Invention

According to the present invention, it is possible to utilize the post injection more effectively.

BRIEF DESCRIPTION OF THE DRAWINGS

FIG. 1 shows a schematic arrangement of an internal combustion engine according to an embodiment.

FIG. 2 shows a relationship between the pressure of the post injection fuel (fuel pressure) and the characteristic of the fuel spray.

FIG. 3 shows a relationship among the fuel injection amount, the requested amount of the post injection fuel, and the injectable amount of the post injection fuel.

FIG. 4 shows a relationship among the pressure of the post injection fuel, the characteristic of the fuel spray, and the range of arrival of the post injection fuel at the wall surface of the cylinder.

FIG. 5A shows a time chart illustrating the transition of the lift amount of a needle of a fuel injection valve when the control of the lift amount of the needle according to the embodiment of the present invention is not carried out.

FIG. 5B shows a time chart illustrating the transition of the lift amount of the needle of the fuel injection valve when the pressure of the fuel is not more than P1, when the load on the internal combustion engine is relatively low.

FIG. 5C shows a time chart illustrating the transition of the lift amount of the needle of the fuel injection valve when the pressure of the fuel is not less than P2, when the load on the internal combustion engine is relatively high.

FIG. 6 shows a flow chart illustrating a flow to determine the valve opening speed of the needle during the post injection according to a first embodiment.

FIG. 7 shows a flow chart illustrating a flow to determine the valve opening speed of the needle during the post injection according to a second embodiment.

FIG. 8 shows time charts illustrating the transitions of the injection rate of the fuel during the post injection and the lift amount of the needle during the post injection when the pressure of the fuel is low.

FIG. 9 shows time charts illustrating the transitions of the injection rate of the fuel during the post injection and the lift amount of the needle during the post injection when the pressure of the fuel is high.

FIG. 10 shows a flow chart illustrating a flow to determine the valve opening speed of the needle during the post injection and the maximum lift amount of the needle according to a third embodiment.

EMBODIMENTS FOR CARRYING OUT THE INVENTION

An explanation will be made in detail below by way of example with reference to the drawings on the basis of an embodiment about a mode for carrying out the present invention. However, for example, the dimension or size, the material, the shape, and the relative arrangement of each of constitutive parts or components described in the embodiment are not intended to limit the scope of the invention only thereto unless specifically noted.

First Embodiment

FIG. 1 shows a schematic arrangement of an internal combustion engine 1 according to this embodiment. In this embodiment, some constitutive parts or components are omitted from the illustration in order to briefly illustrate the internal combustion engine 1. The internal combustion engine 1 is a diesel engine. The internal combustion engine 1 is carried, for example, on a vehicle. A piston 3 is provided for a cylinder 2 of the internal combustion engine 1. A cavity 31, which is recessed toward the inside of the piston, is formed on the upper surface of the piston 3.

A fuel injection valve 4, which directly injects the fuel into the cylinder 2, is provided for the internal combustion engine 1. The fuel injection valve 4 is connected to a common rail 5, and the common rail 5 is communicated with a fuel pump 7 via a fuel supply tube 6. A pressure adjusting mechanism 8 is provided for the fuel injection valve 4, and the pressure of the fuel is adjusted by the pressure adjusting mechanism 8. Note that in this embodiment, it is enough to successfully adjust the pressure of the fuel injected from the fuel injection valve 4. Therefore, the pressure of the fuel may be adjusted by changing the compressibility (compression ratio) of the fuel in the fuel pump 7, in place of the adjustment of the pressure of the fuel by using the pressure adjusting mechanism 8. Alternatively, a mechanism for adjusting the pressure of the fuel may be provided for the common rail 5, and the pressure of the fuel may be adjusted by means of the common rail 5. The construction to adjust the pressure of the fuel as described above is well-known, any explanation of which is omitted.

The fuel injection valve 4 is provided with a needle 42 which opens/closes injection holes 41, and a valve mechanism (valve gear or valve train) 43 which moves the needle 42 upwardly and downwardly. For example, a fuel injection valve of the close coupled type (direct driven type without coupling) can be adopted for the fuel injection valve 4. The valve mechanism 43 is provided with, for example, a piezoelectric element. The valve having the needle 42 is opened by applying the electric power to the piezoelectric element. Note that in this embodiment, it is enough that any mechanism, which moves the needle 42 upwardly and downwardly and which changes the valve opening speed of the needle 42, is provided for the fuel injection valve 4. The construction, which makes it possible to change the valve opening speed of the needle 42 as described above, is well-known, any explanation of which is omitted. Further, the fuel injection valve 4 according to this embodiment can change the valve opening speed of the needle 42 at least at three levels. The fuel injection valve 4 may be any valve which can change the valve opening speed of the needle 42 in a stepless manner. A fuel pressure sensor 11, which detects the pressure of the fuel, is attached to the common rail 5.

ECU 10, which is an electronic control unit or an electronic controller for controlling the internal combustion engine 1, is provided in combination with the internal combustion engine 1 constructed as described above. ECU 10 controls the internal combustion engine 1 in accordance with the operation condition of the internal combustion engine 1 and the request of a driver. An accelerator opening degree sensor 17 which outputs an electric signal corresponding to a pedaling amount of an accelerator pedal pedaled by the driver to detect the engine load, and a crank position sensor 18 which detects the engine rotation speed are connected via electric wirings to ECU 10. Output signals of various sensors as described above are inputted in ECU 10. On the other hand, the pressure adjusting mechanism 8 and the valve mechanism 43 are connected via electric wirings to ECU 10. The apparatuses or devices as described above are controlled by ECU 10. Note that ECU 10 controls the valve mechanism 43 of the fuel injection valve 4. However, in the following description, it is assumed that ECU 10 controls the fuel injection valve 4. ECU 10 adjusts the pressure of the fuel by operating the pressure adjusting mechanism 8. Further, ECU 10 adjusts the valve opening speed of the needle 42 by operating the valve mechanism 43.

ECU 10 determines the fuel injection amount injected from the fuel injection valve 4 and the fuel injection timing as well as the pressure of the fuel on the basis of the operation state of the internal combustion engine 1 (for example, the engine rotation speed and the accelerator opening degree). Note that the relationship among the operation state of the internal combustion engine 1, the fuel injection amount, the fuel injection timing, and the pressure of the fuel is previously obtained and mapped, for example, by means of any experiment, and the relationship is stored in ECU 10. The map is set so that the air-fuel ratio in the cylinder becomes the target air-fuel ratio. The target air-fuel ratio is the air-fuel ratio which is set depending on the operation state of the internal combustion engine 1 (for example, the engine rotation speed and the accelerator opening degree).

In the internal combustion engine 1 according to this embodiment, the post injection is carried out in order to discharge the unburned fuel from the internal combustion engine 1 or discharge the gas having a high temperature from the internal combustion engine 1. The post injection is performed at the timing at which any torque is not generated after the main injection. For example, the post injection is the fuel injection in which the fuel is injected at such a timing that the injected fuel (hereinafter referred to as "post injection fuel") is not combusted. Therefore, the post injection is carried out at such a timing that the fuel is not combusted in the cylinder 2 which has a high temperature and a high pressure as a result of the combustion of the fuel injected during the main injection (hereinafter referred to as "main injection fuel"). For example, the post injection is performed in order to raise the temperature of a filter which is provided downstream from a catalyst by raising the temperature of the catalyst. Further, for example, the post injection is performed in order to supply the unburned fuel as a reducing agent to the catalyst.

The post injection is performed when the piston 3 is located at a position relatively separated from the top dead center. On this account, the post injection fuel is not injected into the inside of the cavity 31, but the post injection fuel is injected toward the wall surface of the cylinder 2. Therefore, it is feared that the post injection fuel may adhere to the wall surface of the cylinder 2.

FIG. 2 shows a relationship between the pressure of the post injection fuel (fuel pressure) and the characteristic of the fuel spray. The "penetration force", which is depicted by a broken line in FIG. 2, indicates the penetration force of the injected fuel. The larger the penetration force of the fuel is, the more easily the spray of the fuel arrives at the wall surface of the cylinder 2. That is, the larger the pressure of the post injection fuel is, the larger the penetration force of the fuel is, wherein the post injection fuel arrives at the wall surface of the cylinder 2 more easily. Further, the "particle diameter", which is depicted by a solid line in FIG. 2, indicates the particle diameter of the fuel after being injected from the injection hole 41. The larger the particle diameter of the fuel is, the more hardly evaporated the fuel is. Therefore, the spray of the fuel arrives at the wall surface of the cylinder 2 more easily. Therefore, the higher the pressure of the fuel is, the larger the penetration force of the fuel is, wherein it is disadvantageous to suppress the dilution of the oil in view of the easy arrival of the fuel at the wall surface of the cylinder 2 while maintaining a form of liquid. On the other hand, the higher the pressure of the fuel is, the smaller the particle diameter of the fuel is, wherein it is advantageous to suppress the dilution of the oil in view of the difficult arrival of the fuel at the wall surface of the cylinder 2 while maintaining a form of liquid. It is possible to determine the injectable amount of the post injection fuel on the basis of the two characteristics of the fuel spray.

FIG. 3 shows a relationship among the load on the internal combustion engine 1, the requested amount of the post injection fuel, and the injectable amount of the post injection fuel. The load plotted on the horizontal axis relates to the fuel injection amount which is provided to generate the torque in the internal combustion engine 1 or the fuel pressure. Therefore, the horizontal axis shown in FIG. 3 may be the fuel injection amount which is provided to generate the torque in the internal combustion engine 1 or the fuel pressure. In this context, the requested amount of the post injection fuel (hereinafter referred to as "requested injection amount") is, for example, the post injection fuel amount which is necessary to raise the temperature of the catalyst to a requested temperature. The higher the load on the internal combustion engine 1 is, the higher the temperature of the exhaust gas is. Therefore, it is enough that the fuel injection amount in the post injection is small. Therefore, the higher the load on the internal combustion engine 1 is, the smaller the requested injection amount is. The injectable amount of the post injection fuel is the upper limit value of the injection amount at which the post injection fuel does not arrive at the wall surface of the cylinder 2. The injectable amount is determined by the particle diameter of the fuel, the penetration force of the fuel, and the temperature in the cylinder 2 as shown in FIG. 2. Note that in this embodiment, the injectable amount corresponds to the injection amount threshold value according to the present invention.

With reference to FIG. 3, the higher the load is, the larger the amount of the gas having the high temperature discharged from the cylinder 2 is. Therefore, it is enough that the post injection fuel amount is small. On this account, the higher the load is, the smaller the requested injection amount is. On the other hand, the higher the load is, the higher the temperature in the cylinder 2 is. Therefore, the injectable amount is increased, because the post injection fuel is easily evaporated. However, when the requested injection amount is larger than the injectable amount, then the evaporation of the fuel delays, and the fuel in a form of liquid may arrive at the wall surface of the cylinder 2. That is, with reference to FIG. 3, in the case of the load in which the requested injection amount is larger than the injectable amount, the fuel may arrive at the wall surface of the cylinder 2.

In this context, the larger the load on the internal combustion engine 1 is, the more easily the smoke is generated. Therefore, the smoke is reduced by increasing the pressure of the main injection fuel. On this account, the larger the load on the internal combustion engine 1 is, the higher the penetration force of the post injection fuel is, wherein the fuel arrives at the wall surface of the cylinder 2 more easily. However, when the load on the internal combustion engine 1 is large, then the requested injection amount itself is decreased, and the fine particle formation of the fuel is facilitated on account of the increase in the pressure of the post injection fuel. Therefore, the post injection fuel amount, which arrives at the wall surface of the cylinder 2, is decreased as a whole.

On the other hand, the smaller the load on the internal combustion engine 1 is, the more lowered the pressure of the main injection fuel is. Then, the temperature in the cylinder 2 is lowered, and the particle diameter of the post injection fuel is increased as well. Therefore, the post injection fuel is hardly evaporated. Further, the requested injection amount is increased, because the temperature is low. On this account, the smaller the load on the internal combustion engine 1 is, the larger the post injection fuel amount arriving at the wall surface of the cylinder 2 is.

Therefore, when the load on the internal combustion engine 1 is low, i.e., when the pressure of the fuel is low, then it is possible to suppress the post injection fuel from arriving at the wall surface of the cylinder 2 by facilitating the evaporation of the post injection fuel. On the other hand, when the load on the internal combustion engine 1 is high, i.e., when the pressure of the fuel is high, then it is possible to suppress the post injection fuel from arriving at the wall surface of the cylinder 2 by reducing the penetration force of the post injection fuel.

In view of the above, in this embodiment, the particle diameter of the fuel and the penetration force of the fuel are adjusted by adjusting the valve opening speed of the needle 42 during the post injection. If the needle 42 of the fuel injection valve 4 is closed, then the needle 42 is brought in contact with the inner wall surface of the fuel injection valve 4, and thus the passage for the fuel is shut off. In this situation, the fuel cannot pass through between the needle 42 and the inner wall surface of the fuel injection valve 4. On the other hand, at the initial stage at which the needle 42 of the fuel injection valve 4 is opened, then the needle 42 is separated from the inner wall surface of the fuel injection valve 4, and the distance between the needle 42 and the inner wall surface of the fuel injection valve 4 is gradually increased. That is, the distance between the forward end portion of the needle 42 and the inner wall surface of the fuel injection valve 4 is increased in accordance with the upward movement of the forward end portion of the needle 42. On this account, the cross-sectional area of the passage for the fuel in the fuel injection valve 4 is gradually increased. The larger the cross-sectional area of the passage for the fuel is, the larger the amount of the fuel capable of flowing per unit time is. Therefore, the fuel injection amount per unit time is increased. The larger the fuel injection amount per unit time is, the higher the penetration force of the fuel is, wherein the fine particle formation of the fuel is facilitated. Therefore, the fine particle formation of the fuel is facilitated by raising the valve opening speed of the needle 42. On this account, it is possible to facilitate the evaporation of the fuel by raising the valve opening speed of the needle 42 when the pressure of the fuel is low. In this situation, the penetration force of the fuel is raised, but the pressure of the fuel is low. Therefore, the post injection fuel is suppressed from arriving at the wall surface of the cylinder 2.

On the other hand, the cross-sectional area of the passage for the fuel in the fuel injection valve 4 is gently increased by lowering the valve opening speed of the needle 42. Therefore, the period, in which the fuel injection amount per unit time is small, is prolonged. That is, the period, in which the penetration force of the fuel is low, is prolonged. Then, the fuel having the low penetration force is injected, and thus it is possible to suppress the post injection fuel from arriving at the wall surface of the cylinder 2. On this account, it is possible to suppress the post injection fuel from arriving at the wall surface of the cylinder 2 by lowering the valve opening speed of the needle 42 when the pressure of the fuel is high. In this situation, the temperature in the cylinder 2 is high, and hence the post injection fuel is evaporated even when the penetration force of the fuel is lowered.

Note that the fuel injection amount per unit time becomes constant after the lift amount of the needle 42 is increased to some extent. Therefore, the penetration force of the fuel is identical irrelevant to the valve opening speed of the needle 42. That is, the penetration force of the fuel is changed depending on the valve opening speed of the needle 42 in the period in which the lift amount of the needle 42 is increased to some extent. However, the penetration force of the fuel is constant irrelevant to the valve opening speed of the needle 42 after the lift amount of the needle 42 is increased to some extent. In the case of the post injection, the injection amount of the fuel is relatively small. Therefore, the needle 42 is closed in many cases before the lift amount of the needle 42 is increased to some extent. That is, the needle 42 is moved upwardly and downwardly in a range in which the valve opening speed of the needle 42 and the penetration force of the fuel are correlated with each other. Therefore, it is possible to adjust the penetration force of the fuel by adjusting the valve opening speed of the needle 42. Note that even when the fuel injection amount per unit time becomes constant in the middle of the post injection, the valve opening speed of the needle 42 and the penetration force of the fuel are correlated with each other until that time. Therefore, it is possible to obtain the effect of this embodiment.

FIG. 4 shows a relationship among the pressure of the post injection fuel, the characteristic of the fuel spray, and the range of arrival of the post injection fuel at the wall surface of the cylinder 2. FIG. 4 is the drawing in which the range of arrival of the post injection fuel at the wall surface of the cylinder 2 is added to FIG. 2. Note that the adapted pressure is the pressure of the fuel which is set depending on the operation state of the internal combustion engine 1, and the adapted pressure is the pressure of the fuel which is previously determined and set, for example, by means of any experiment or simulation. The adapted pressure shown in FIG. 4 is the adapted pressure which is provided at a certain point in time. The adapted pressure is set, for example, so that the smoke is reduced.

With reference to FIG. 4, an alternate long and two short dashes line indicates the characteristic of the fuel spray which provides the lower limit value of the range of arrival of the post injection fuel at the wall surface of the cylinder 2. The post injection fuel can arrive at the wall surface of the cylinder 2 in the range disposed on and above the alternate long and two short dashes line. That is, if the pressure of the fuel is not more than P1, then the particle diameter is excessively large, and the fuel is hardly evaporated. Therefore, the post injection fuel arrives at the wall surface of the cylinder 2. On the other hand, if the pressure of the fuel is not less than P2, then the penetration force of the post injection fuel becomes excessively high, and the fuel arrives at the wall surface of the cylinder 2 before being evaporated. The adapted pressure shown in FIG. 4 is the pressure which is not less than P2. Therefore, in the case of the adapted pressure in this situation, the fuel arrives at the wall surface of the cylinder 2. On the contrary, in this embodiment, the valve opening speed of the needle 42 is raised as compared with that provided during the main injection so that the particle diameter of the post injection is decreased when the pressure of the fuel is not more than P1. Further, when the pressure of the fuel is not less than P2, the valve opening speed of the needle 42 is lowered as compared with that provided during the main injection so that the penetration force of the fuel is lowered. Note that in this embodiment, P1 corresponds to the first predetermined pressure according to the present invention, and P2 corresponds to the second predetermined pressure according to the present invention.

Note that even when the pressure of the fuel is higher than P1 and lower than P2, if the load is exerted such that the requested injection amount is larger than the injectable amount, then the fuel may arrive at the wall surface of the cylinder 2. In such a situation, even when the valve opening speed of the needle 42 is adjusted, it is difficult to suppress the fuel from arriving at the wall surface of the cylinder 2. In such a situation, it is also allowable to suppress the post injection fuel from arriving at the wall surface of the cylinder 2 by using any well-known technique. In this case, it is also allowable to suppress the post injection fuel from adhering to the wall surface of the cylinder 2, for example, by reducing the amount of the post injection fuel and/or injecting the post injection fuel in a divided manner a plurality of times.

FIGS. 5A, 5B, and 5C show time charts illustrating the transitions of the lift amount of the needle 42 of the fuel injection valve 4. FIG. 5A shows a case in which the control of the lift amount of the needle 42 according to this embodiment is not carried out. This can be also referred to as the transition of the lift amount during the ordinary control. The ordinary control is the control in which the valve opening speed of the needle 42 is the same between the main injection and the post injection, which may be also referred to as the conventional control. Further, FIG. 5A may be also referred to as the drawing provided when the pressure of the fuel is higher than P1 and lower than P2. FIG. 5B shows a case in which the load on the internal combustion engine 1 is relatively low and the pressure of the fuel is not more than P1. FIG. 5C shows a case in which the load on the internal combustion engine 1 is relatively high and the pressure of the fuel is not less than P2. In FIGS. 5A, 5B, and 5C, the pilot injection is performed before the main injection, and the post injection is performed after the main injection. If the valve opening speed of the needle 42 is high, the inclination of the lift amount shown in FIGS. 5A, 5B, and 5C is increased.

That is, as shown in FIG. 5B, if the pressure of the fuel is not more than P1, then the inclination of the needle 42 during the post injection is large, and the penetration force of the fuel is high. The inclination of the lift amount of the needle 42 during the post injection, which is provided in this situation, is larger than the inclinations provided during the ordinary control and the main injection. On the other hand, as shown in FIG. 5C, if the pressure of the fuel is not less than P2, then the inclination of the lift amount of the needle 42 during the post injection is small, and the penetration force of the fuel is low. The inclination of the lift amount of the needle 42 during the post injection, which is provided in this situation, is smaller than the inclinations provided during the ordinary control and the main injection.

Next, FIG. 6 shows a flow chart illustrating a flow to determine the valve opening speed of the needle 42 during the post injection according to this embodiment. This flow chart is executed by ECU 10 every time when the combustion cycle is carried out. Note that in this embodiment, ECU 10, which executes the flow chart shown in FIG. 6, corresponds to the controller according to the present invention.

In Step S101, it is judged whether or not the request to carry out the post injection is made. That is, it is judged whether or not the request to discharge the unburned fuel from the internal combustion engine 1 is made. In this step, for example, if the request to raise the temperature of the catalyst, the request to regenerate the filter, the request to recover the sulfur poisoning of the catalyst, and/or the request to supply the reducing agent to the catalyst is/are made, it is judged that the request to carry out the post injection is made. If the affirmative judgment is made in Step S101, the routine proceeds to Step S102. On the other hand, if the negative judgment is made, this flow chart is terminated.

In Step S102, the operation state of the internal combustion engine 1 is detected. In this step, the engine rotation speed and the fuel injection amount are detected. The fuel injection amount is correlated with the accelerator opening degree. Therefore, it is also allowable to detect the accelerator opening degree in place of the fuel injection amount. Note that the fuel injection amount is the fuel injection amount which relates to the torque of the internal combustion engine 1, which is the amount of the fuel obtained by combining those of the pilot injection, the main injection, and the after injection. If the process of Step S102 is terminated, the routine proceeds to Step S103.

In Step S103, the requested injection amount QP is calculated. For example, when the post injection is carried out in order to raise the temperature of the catalyst, the injection amount is calculated as the post injection fuel amount which is required to raise the temperature of the catalyst to the requested temperature. That is, the requested injection amount QP is calculated on the basis of the engine rotation speed and the fuel injection amount detected in Step S102. The relationship between the requested injection amount QP, the engine rotation speed, and the fuel injection amount may be previously determined and mapped by means of, for example, any experiment or simulation. If the process of Step S103 is terminated, the routine proceeds to Step S104.

In Step S104, the fuel pressure PCR is acquired. The fuel pressure PCR is detected by the fuel pressure sensor 11. Note that the fuel pressure PCR is determined depending on the operation state of the internal combustion engine 1. Therefore, it is also allowable to use the determined fuel pressure. If the process of Step S104 is terminated, the routine proceeds to Step S105.

In Step S105, the injectable amount QPL of the post injection is calculated. As shown in FIG. 3, the injectable amount QPL relates to the fuel injection amount (load on the internal combustion engine 1 or torque of the internal combustion engine 1). Therefore, the relationship between the injectable amount QPL and the fuel injection amount is previously determined, for example, by means of any experiment or simulation, and the relationship is stored in ECU 10 beforehand. If the process of Step S105 is terminated, the routine proceeds to Step S106.

In Step S106, it is judged whether or not the requested injection amount QP is larger than the injectable amount QPL. In this step, it is judged whether or not the post injection fuel can arrive at the wall surface of the cylinder 2. If the affirmative judgment is made in Step S106, the routine proceeds to Step S107. On the other hand, if the negative judgment is made, this flow chart is terminated.

In Step S107, it is judged whether or not the fuel pressure PCR is not more than P1 shown in FIG. 4. In this step, it is judged whether or not the particle diameter of the post injection is increased on account of the low fuel pressure PCR and the fuel can consequently arrive at the wall surface of the cylinder 2 before being evaporated. If the affirmative judgment is made in Step S107, the routine proceeds to Step S108. The valve opening speed of the needle 42 during the post injection is raised as compared with the valve opening speed of the needle 42 during the main injection. Accordingly, the particle diameter of the post injection fuel is decreased. Therefore, the post injection fuel is suppressed from adhering to the wall surface of the cylinder 2. If the process of Step S108 is terminated, this flow chart is terminated.

On the other hand, if the negative judgment is made in Step S107, the routine proceeds to Step S109. In Step S109, it is judged whether or not the fuel pressure PCR is not less than P2 shown in FIG. 4. In this step, it is judged whether or not the penetration force of the post injection fuel is raised on account of the high fuel pressure PCR and the fuel can consequently arrive at the wall surface of the cylinder 2 before being evaporated. If the affirmative judgment is made in Step S109, the routine proceeds to Step S110. The valve opening speed of the needle 42 during the post injection is lowered as compared with the valve opening speed of the needle 42 during the main injection. Accordingly, the penetration force of the post injection fuel is lowered. Therefore, the post injection fuel is suppressed from adhering to the wall surface of the cylinder 2. If the process of Step S110 is terminated, this flow chart is terminated.

Further, if the negative judgment is made in Step S109, the routine proceeds to Step S111. The post injection fuel is suppressed from arriving at the cylinder 2 by means of, for example, any well-known technique. Thus, the arrival of the fuel at the cylinder 2 is suppressed by means of any method other than the adjustment of the valve opening speed of the needle 42. If the process of Step S111 is terminated, this flow chart is terminated.

Note that in this embodiment, the valve opening speed of the needle 42 is not changed in the range in which the fuel pressure PCR is higher than P1 and lower than P2. However, in place thereof, it is also allowable that the range, in which the valve opening speed of the needle 42 is not changed unlike the above, is not provided. That is, if the requested injection amount QP is larger than the injectable amount QPL, it is also allowable that the valve opening speed of the needle 42 during the post injection is always raised or delayed as compared with the valve opening speed of the needle 42 during the main injection. In this case, it is also allowable to consider that P1 and P2 have an identical value. For example, with reference to FIG. 2, it is also allowable that the pressure, at which the "penetration force" and the "particle diameter" intersect, is P1 and P2. In such a situation, it is regarded as P1 and P2 are equal to one another, and Step S109 and Step S111 are not carried out in the flow chart shown in FIG. 6. Then, if the negative judgment is made in Step S107, the routine proceeds to Step S110.

As explained above, in this embodiment, the particle diameter of the fuel and the penetration force of the fuel are adjusted by changing the valve opening speed of the needle 42 depending on the pressure of the fuel. Then, when the pressure of the fuel is low, then the valve opening speed of the needle 42 during the post injection is made higher than the valve opening speed of the needle 42 during the main injection, and thus it is possible to decrease the particle diameter of the fuel. Accordingly, it is possible to facilitate the evaporation of the fuel, and hence it is possible to suppress the post injection fuel from arriving at the wall surface of the cylinder 2. On the other hand, when the pressure of the fuel is high, then the valve opening speed of the needle 42 during the post injection is made lower than the valve opening speed of the needle 42 during the main injection, and thus it is possible to lower the penetration force of the fuel. Accordingly, it is possible to suppress the post injection fuel from arriving at the wall surface of the cylinder 2. On this account, it is also possible to widen the operation area in which the post injection is performed. That is, it is possible to widen the operation area in which, for example, the regeneration of the filter, the regeneration from the S poisoning, and/or the increase in the temperature of the catalyst is/are performed.

Note that in this embodiment, the post injection is performed only once. However, in place thereof, it is also possible to perform the post injection in a divided manner two or more times. In relation thereto, even when the valve opening speed of the needle 42 is lowered, if the valve opening time is prolonged, then the lift amount of the needle 42 is increased. Therefore, the cross-sectional area of the passage for the fuel in the fuel injection valve 4 is increased. On this account, the penetration force of the fuel is raised. On the other hand, it is possible to inject the fuel having the low penetration force again by terminating the first time post injection before the penetration force of the fuel is raided and then performing the second time post injection. Therefore, it is possible to inject a larger amount of the fuel having the low penetration force as a whole. Even in the case of any area, it is also allowable that the post injection is performed in a divided manner two or more times depending on the post injection fuel amount.

Second Embodiment

In the first embodiment, the explanation has been made about the case in which the valve opening speed of the needle 42 during the post injection is raised as compared with the valve opening speed of the needle 42 during the main injection and the case in which the valve opening speed of the needle 42 during the post injection is lowered as compared with the valve opening speed of the needle 42 during the main injection. That is, there are three ways of the valve opening speed of the needle 42 in combination with the main injection, and the valve opening speed of the needle 42 is changed at three levels. On the other hand, when a fuel injection valve 4, which can change the valve opening speed of the needle 42 at four or more levels or in a stepless manner, is used, it is also allowable that the valve opening speed of the needle 42 is changed at four or more levels or changed in a stepless manner, in place of the change of the valve opening speed of the needle 42 at the three levels. Then, it is also allowable that the valve opening speed of the needle 42 during the post injection is lowered in order to lower the penetration force of the post injection fuel as the pressure of the fuel is more raised. In this case, it is also allowable to consider that P1 and P2 are equal to one another as explained in the first embodiment.

For example, when the pressure of the fuel is not more than P1 (or may be not more than P2), then the valve opening speed of the needle 42 during the post injection is raised as compared with the valve opening speed of the needle 42 during the main injection, and the valve opening speed of the needle 42 is more lowered as the pressure of the fuel is more raised. Otherwise, when the pressure of the fuel is not less than P1 (or may be not less than P2), then the valve opening speed of the needle 42 during the post injection is lowered as compared with the valve opening speed of the needle 42 during the main injection, and the valve opening speed of the needle 42 is more lowered as the pressure of the fuel is more raised. Further, in any one of the case in which the pressure of the fuel is not more than P1 (or may be not more than P2) and the case in which the pressure of the fuel is not less than P1 (or may be not less than P2), it is also allowable that the higher the pressure of the fuel is, the lower the valve opening speed of the needle 42 is. Even when the operation is performed as described above, it is possible to reduce the post injection fuel amount arriving at the wall surface of the cylinder 2. Therefore, it is possible to suppress the dilution of the oil.

Accordingly, in this embodiment, an explanation will be made about the control performed when the valve opening speed of the needle 42 is changed in a stepless manner depending on the pressure of the fuel during the post injection. For example, other apparatuses and devices are the same as those of the first embodiment, any explanation of which is omitted. FIG. 7 shows a flow chart illustrating a flow to determine the valve opening speed of the needle 42 during the post injection according to this embodiment. This flow chart is executed by ECU 10 every time when the combustion cycle is carried out. The steps, in which the same processes as those of the flow chart described above are performed, are designated by the same reference numerals, any explanation of which is omitted. Note that in this embodiment, ECU 10, which executes the flow chart shown in FIG. 7, corresponds to the controller according to the present invention.

In the flow chart shown in FIG. 7, if the affirmative judgment is made in Step S106, the routine proceeds to Step S201. In Step S201, the valve opening speed of the needle 42 of the fuel injection valve 4 during the post injection is set depending on the fuel pressure PCR. The relationship between the fuel pressure PCR and the valve opening speed of the needle 42 during the post injection is previously determined by means of any experiment or simulation so that the fuel does not arrive at the wall surface of the cylinder 2. The relationship may be mapped beforehand. In Step S201, the setting is made so that the higher the fuel pressure PCR is, the lower the valve opening speed of the needle 42 during the post injection is. Further, the valve opening speed of the needle 42 during the post injection is raised as compared with the valve opening speed of the needle 42 during the main injection on the side on which the fuel pressure PCR is low. The valve opening speed of the needle 42 during the post injection is lowered as compared with the valve opening speed of the needle 42 during the main injection on the side on which the fuel pressure PCR is high. If the process of Step S201 is terminated, this flow chart is terminated. In this way, it is also possible to adjust the particle diameter of the fuel and the penetration force of the fuel by changing the valve opening speed of the needle 42 in the stepless manner depending on the pressure of the fuel.

Third Embodiment

In this embodiment, the maximum value of the lift amount of the needle 42 (hereinafter referred to as "maximum lift amount") is adjusted in order to realize the injection rate which is the target during the post injection. Therefore, a fuel injection valve 4 according to this embodiment can arbitrarily change the maximum lift amount of the needle 42 by means of a valve mechanism 43. The valve opening speed of the needle 42 can be determined in the same manner as in the first embodiment. For example, other apparatuses or devices are the same as those of the embodiment described above, any explanation of which is omitted.

In this case, as described above, if the lift amount of the needle 42 is increased, then the fuel injection amount per unit time (i.e., injection rate) is increased, and the penetration force of the fuel is raised. Therefore, if the post injection fuel amount is increased, then the penetration force of the fuel is excessively increased, and it is feared that the post injection fuel may arrive at the wall surface of the cylinder 2. On the contrary, in this embodiment, the maximum lift amount of the needle 42 during the post injection is decreased when the pressure of the fuel is high as compared with when the pressure of the fuel is low, so that the penetration force of the post injection fuel is not excessively raised. In this situation, in the same manner as in the first embodiment, if the pressure of the fuel is low, the valve opening speed of the needle 42 during the post injection is raised as compared with the valve opening speed of the needle 42 during the main injection. On the other hand, if the pressure of the fuel is high, the valve opening speed of the needle 42 during the post injection is lowered as compared with the valve opening speed of the needle 42 during the main injection.

In this embodiment, the injection ratio, at which the post injection fuel does not arrive at the wall surface of the cylinder 2, is calculated in accordance with the pressure of the fuel, and the lift amount of the needle 4 is calculated so that the injection ratio is provided. On this account, in this embodiment, the valve opening speed of the needle 42 and the maximum lift amount of the needle 42 are calculated in accordance with the pressure of the fuel.

FIG. 8 shows time charts illustrating the transitions of the injection rate of the fuel during the post injection and the lift amount of the needle 42 during the post injection when the pressure of the fuel is low. Further, FIG. 9 shows time charts illustrating the transitions of the injection rate of the fuel during the post injection and the lift amount of the needle 42 during the post injection when the pressure of the fuel is high. The solid line indicates the case in which the control of the needle 42 according to this embodiment is performed, and the broken line indicates the case of the ordinary control (which resides in such a case that the control of the needle 42 according to this embodiment is not performed or which may reside in a case of the conventional control). The valve opening speed of the needle 42 during the ordinary control is identical between the main injection and the post injection.

In this embodiment, if the pressure of the fuel is low, the valve opening speed of the needle 42 is raised as compared with that provided during the ordinary control. On this account, the inclination of the lift amount of the needle 42 provided according to this embodiment is larger than the inclination of the lift amount of the needle 42 provided during the ordinary control. Accordingly, the increase in the injection rate is steep as compared with that provided during the ordinary control. In this way, it is possible to decrease the particle diameter of the fuel by raising the valve opening speed of the needle 42. Therefore, it is possible to facilitate the evaporation of the post injection fuel. Further, in this embodiment, when the pressure of the fuel is low, the maximum lift amount of the needle 42 provided during the post injection is made smaller than that provided during the ordinary control. The maximum lift amount of the needle 42 provided in this situation is set so that the post injection fuel does not arrive at the wall surface of the cylinder 2.

On the other hand, in this embodiment, if the pressure of the fuel is high, the valve opening speed of the needle 42 is lowered as compared with that provided during the ordinary control. On this account, the inclination of the lift amount of the needle 42 provided according to this embodiment is smaller than the inclination of the lift amount of the needle 42 provided during the ordinary control. Accordingly, the increase in the injection rate is gentle as compared with that provided during the ordinary control. In relation thereto, it is also possible to say that the valve opening speed of the needle 42 is lowered when the pressure of the fuel is high as compared with when the pressure of the fuel is low. Further, it is also possible to say that the increase in the injection rate is gentle when the pressure of the fuel is high as compared with when the pressure of the fuel is low. In this way, it is possible to lower the penetration force of the fuel even when the pressure of the fuel is high, by lowering the valve opening speed of the needle 42. Further, in this embodiment, when the pressure of the fuel is high, the maximum lift amount of the needle 42 is made smaller than that provided during the ordinary control. The maximum lift amount of the needle 42 provided in this situation is set so that the post injection fuel does not arrive at the wall surface of the cylinder 2. In this context, the penetration force of the fuel is high when the pressure of the fuel is high as compared with when the pressure of the fuel is low. Therefore, the post injection fuel easily arrives at the wall surface of the cylinder 2. On this account, in this embodiment, the penetration force of the post injection fuel is suppressed from being increased, by decreasing the maximum lift amount of the needle 42 during the post injection when the pressure of the fuel is high as compared with when the pressure of the fuel is low.

In this context, when the pressure of the fuel is low, the injection rate of the fuel is not increased so much, even when the maximum lift amount of the needle 42 is relatively large. Therefore, it is possible to relatively increase the maximum lift amount of the needle 42. On the other hand, when the pressure of the fuel is high, the injection rate of the fuel is increased, even when the maximum lift amount of the needle 42 is relatively small. On this account, the maximum lift amount of the needle 42 provided during the post injection is small when the pressure of the fuel is high as compared with when the pressure of the fuel is low. In this way, the penetration force of the fuel is suppressed from being increased by decreasing the maximum lift amount of the needle 42 during the post injection when the pressure of the fuel is high.

Note that the injection rate of the post injection fuel is lowered by decreasing the maximum lift amount of the needle 42 provided during the post injection as compared with that provided during the ordinary control. Therefore, the post injection fuel amount is suppressed from being lowered by prolonging the valve opening time of the fuel injection valve 4 as compared with the ordinary control.

In this context, the maximum lift amount LMAX of the needle 42 is correlated with the cross-sectional area A of the passage for the fuel between the needle 42 and the inner wall surface of the fuel injection valve 4. The following relationship is given between the target maximum injection rate DQMAX during the post injection and the cross-sectional area A of the passage for the fuel in the fuel injection valve 4.

$$DQMAX = CD \cdot A \cdot \sqrt{\frac{2(PCR - PA)}{D}} \quad (1)$$

In the expression, CD represents the flow rate coefficient, which is to be previously determined. PCR represents the fuel pressure (Pa), which is determined depending on the operation state of the internal combustion engine 1. PA represents the atmosphere pressure during the post injection (internal pressure of the combustion chamber) (Pa), which is estimated on the basis of the operation state of the internal combustion engine 1. D represents the density (kg/mm³) of the fuel, for which the assumed density of the fuel is to be previously determined.

Then, it is possible to previously determine the relationship between the maximum lift amount LMAX of the needle 42 and the cross-sectional area A of the passage for the fuel between the needle 42 and the inner wall surface of the fuel injection valve 4. Therefore, it is possible to determine the maximum lift amount LMAX of the needle 42 from the cross-sectional area A obtained on the basis of the relationship shown in the expression (1). The maximum lift amount LMAX determined as described above is applied during the post injection, and thus the maximum injection rate of the post injection fuel can be adjusted to the target maximum injection rate DQMAX. Note that the target maximum injection rate DQMAX can be previously determined, for example, by means of any experiment or simulation while being correlated with the pressure of the fuel.

FIG. 10 shows a flow chart illustrating a flow to determine the valve opening speed of the needle 42 during the post injection and the maximum lift amount of the needle 42 according to this embodiment. This flow chart is executed by ECU 10 every time when the combustion cycle is carried out. The steps, in which the same processes as those of the flow chart described above are performed, are designated by the same reference numerals, any explanation of which is omitted. Note that in this embodiment, ECU 10, which executes the flow chart shown in FIG. 10, corresponds to the controller according to the present invention.

In the flow chart shown in FIG. 10, if the affirmative judgment is made in Step S106, then the routine proceeds to Step S301, and the target maximum injection rate DQMAX is determined. The target maximum injection rate DQMAX is determined on the basis of the fuel pressure PCR. The relationship between the target maximum injection rate DQMAX and the fuel pressure PCR is previously determined, for example, by means of any experiment or simulation as the relationship in which the post injection fuel does not arrive at the wall surface of the cylinder 2, and the relationship is stored in ECU 10 beforehand. If the process of Step S301 is terminated, the routine proceeds to Step S302.

In Step S302, the maximum lift amount LMAX of the needle 42 is calculated from the target maximum injection rate DQMAX. The expression, with which the maximum lift amount LMAX of the needle 42 is calculated from the target maximum injection rate DQMAX, is previously stored in ECU 10. If the process of Step S302 is terminated, the routine proceeds to Step S107.

Further, in this embodiment, when a fuel injection valve 4, which can change the valve opening speed of the needle 42 at four or more levels or in a stepless manner, is used in the same manner as in the first embodiment, it is also allowable that the valve opening speed of the needle 42 is changed at four or more levels or changed in a stepless manner, in place of the change of the valve opening speed of the needle 42 at the three levels.

As explained above, in this embodiment, the cross-sectional area of the passage for the fuel in the fuel injection valve 4 is decreased by decreasing the maximum lift amount of the needle 42. When the fuel passes through the portion at which the cross-sectional area is small, the pressure of the fuel is lowered thereby. As a result, the amount of the fuel, which is injected per unit time into the cylinder 2, is reduced. In this way, it is possible to reduce the penetration force of the post injection fuel, and hence it is possible to suppress the fuel from arriving at the cylinder 2.

DESCRIPTION OF THE REFERENCE SIGNS

1: internal combustion engine, 2: cylinder, 3: piston, 4: fuel injection valve, 5: common rail, 6: fuel supply tube, 7:

fuel pump, 8: pressure adjusting mechanism, 10: ECU, 11: fuel pressure sensor, 17: accelerator opening degree sensor, 18: crank position sensor, 31: cavity, 41: injection hole, 42: needle, 43: valve mechanism.

The invention claimed is:

1. An internal combustion engine comprising a fuel injection valve which has a needle and which injects fuel into a cylinder of the internal combustion engine when the valve having the needle is opened, the internal combustion engine further comprising:

an electronic control unit comprising at least one processor, wherein, when a requested injection amount of the fuel to be injected by a post injection is larger than an injection amount threshold value, and when the post injection is carried out after a main injection of the fuel to be injected from the fuel injection valve, the at least one processor is configured to:

raise a valve opening speed of the needle during the post injection as compared with a valve opening speed of the needle during the main injection if a pressure of the fuel is not more than a first predetermined pressure; and lower the valve opening speed of the needle during the post injection as compared with the valve opening speed of the needle during the main injection if the pressure of the fuel is not less than a second predetermined pressure that is a pressure larger than the first predetermined pressure.

2. The internal combustion engine according to claim 1, wherein the at least one processor is configured to operate such that the higher the pressure of the fuel is, the lower the valve opening speed of the needle during the post injection is, if the pressure of the fuel is not more than the first predetermined pressure or if the pressure of the fuel is not less than the second predetermined pressure.

3. The internal combustion engine according to claim 1, wherein the at least one processor is configured to operate such that a maximum value of a lift amount of the needle during the post injection is decreased when the pressure of the fuel is high as compared with when the pressure of the fuel is low, if the pressure of the fuel is not more than the first predetermined pressure or if the pressure of the fuel is not less than the second predetermined pressure.

4. The internal combustion engine according to claim 2, wherein the at least one processor is configured to operate such that a maximum value of a lift amount of the needle during the post injection is decreased when the pressure of the fuel is high as compared with when the pressure of the fuel is low, if the pressure of the fuel is not more than the first predetermined pressure or if the pressure of the fuel is not less than the second predetermined pressure.

* * * * *